July 1, 1958 — M. O. DE VOS ET AL — 2,841,212
FOLDING EXTENSIBLE ARM REST
Filed Jan. 18, 1956 — 3 Sheets-Sheet 1

INVENTORS
Marcel O. DeVos &
BY Letcher B. Hunt Jr.
Paul Fitzpatrick
ATTORNEY

INVENTORS.
Marcel O. DeVos &
Letcher B. Hunt Jr.
BY Paul Fitzpatrick
ATTORNEY

July 1, 1958 M. O. DE VOS ET AL 2,841,212
FOLDING EXTENSIBLE ARM REST
Filed Jan. 18, 1956 3 Sheets-Sheet 3
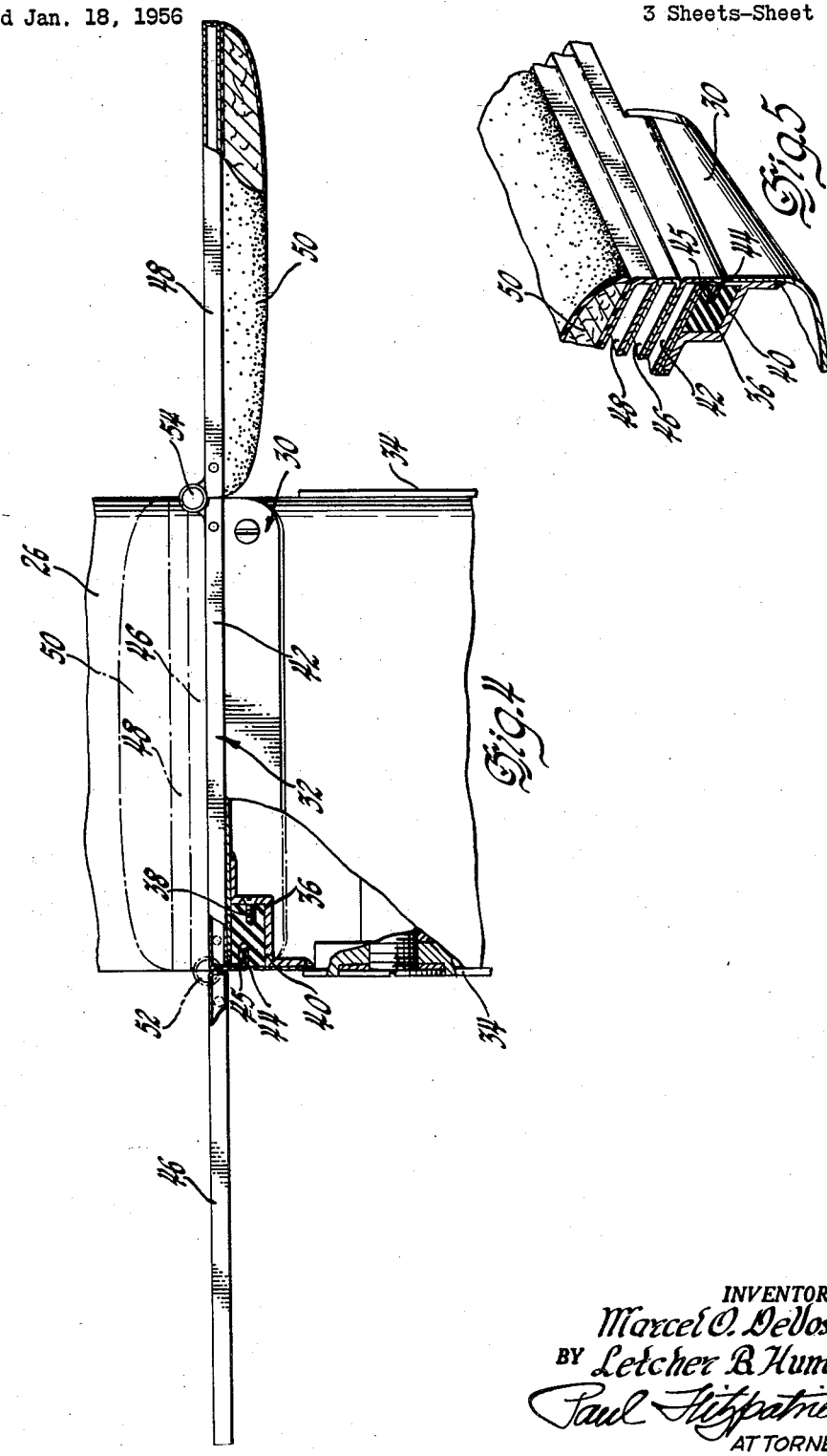
INVENTORS.
Marcel O. DeVos &
BY Letcher B. Hunt Jr.
Paul Fitzpatrick
ATTORNEY

United States Patent Office 2,841,212
Patented July 1, 1958

2,841,212

FOLDING EXTENSIBLE ARM REST

Marcel O. De Vos, Grosse Pointe Woods, and Letcher B. Hunt, Jr., Detroit, Mich., assignors to General Motors Corporation, Detroit, Mich., a corporation of Delaware Application January 18, 1956, Serial No. 559,869

6 Claims. (Cl. 155—198)

This invention relates to an extensible arm rest, and more particularly to an extensible folding arm rest for an automobile.

One feature of the invention is that it provides an improved extensible arm rest; another feature of the invention is that it provides an arm rest having a base portion which may be pivoted between an out-of-the-way or retracted position and a generally horizontal operating position; a further feature of the invention is that the base portion of the arm rest slidably mounts an extensible portion so that the length of the arm rest can be extended; still another feature of the invention is that the extensible portion comprises a lower member and intermediate and upper leaf members which are hingedly mounted on the lower member along opposite sides thereof, the leaf members being swingable to horizontal positions at opposite sides of the lower member, whereby surfaces of the leaf members and the lower member form a plane table surface.

Other features and advantages of the invention will be apparent from the following description and from the drawings, in which:

Fig. 4 is a vertical transverse section taken along the line 4—4 of Fig. 3, the leaf members of the arm rest being shown in their extended or table position in solid lines and in their folded or arm rest position in broken lines; and Fig. 5 is an isometric detail section through a portion of the arm rest, showing the internal construction thereof.

Figure 1:
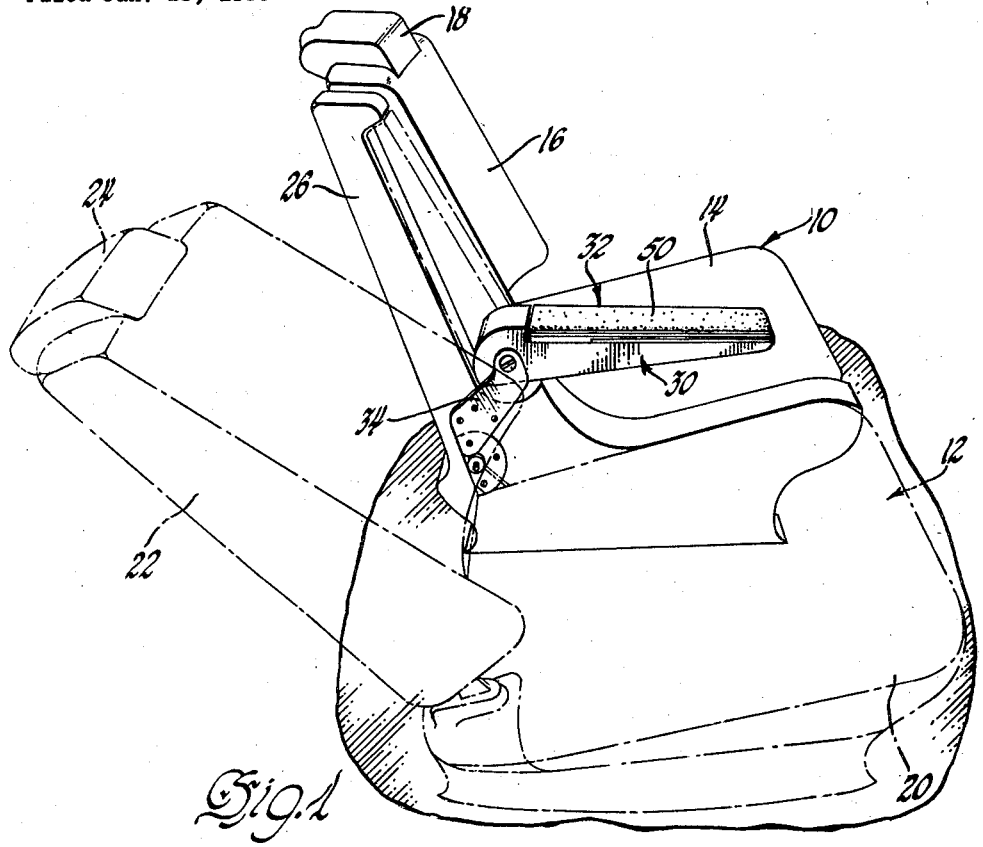
Fig. 1 is an isometric view of a seating arrangement in the passenger compartment of an automobile, the improved arm rest being mounted between the seats, the arm rest being shown in solid lines in its horizontal operating position and in broken lines in its vertical retracted position.

Referring now more particularly to the drawings, the passenger compartment of an automobile may be provided with a pair of individual seats designated generally as 10 and 12. The seat 10 includes a seat cushion 14, a seat back 16 and a head rest 18. Similarly, the seat 12 includes a seat cushion 20, a seat back 22 and a head rest 24. The seat backs may be tiltable as shown in Fig. 1. Between the seats there is a stanchion or spacing member 26, the external configuration of which conforms generally to the configuration of the seat cushions and seat backs.

The folding extensible arm rest which forms the subject of this invention includes a base portion 30 and an extensible portion 32. The base portion is pivoted at its lower or rear end at opposite sides on brackets 34 which are bolted to the stanchion 26. Any conventional type of stop means (not shown) may be provided to limit the swinging movement of the arm rest between the two positions shown in Fig. 1, these positions being a generally vertical retracted position shown in broken lines wherein the arm rest lies against the stanchion in the plane of the seat back and a generally horizontal operating position shown in solid lines. As shown in Figs. 4 and 5, the base portion 30 of the arm rest is provided with tracks 36 at opposite sides but inside the side walls of the base. Each of these tracks may be formed of an elongated grooved nylon block which is secured by screws 38 to a steel supporting member 40 which extends along the upper edge at each side of the base 30.

Figure 2:
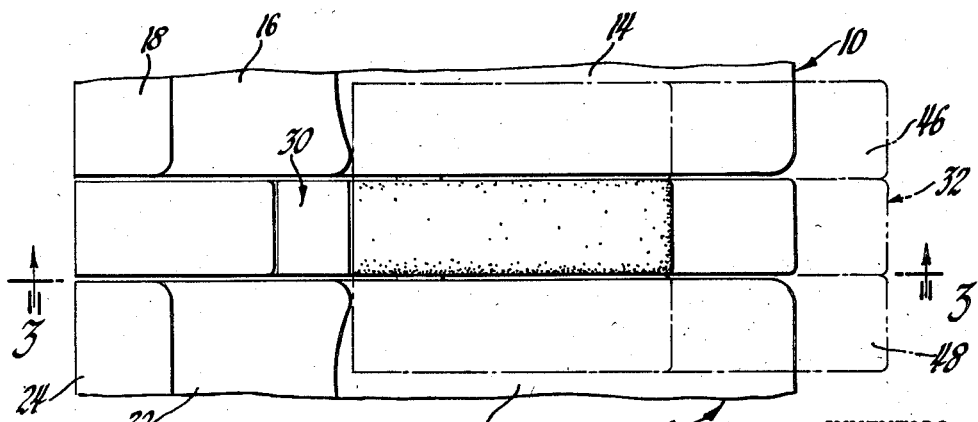
Fig. 2 is a fragmentary top plan view of the structure of Fig. 1, the arm rest being shown in one position in solid lines and in extended positions in broken lines.
Figure 3:
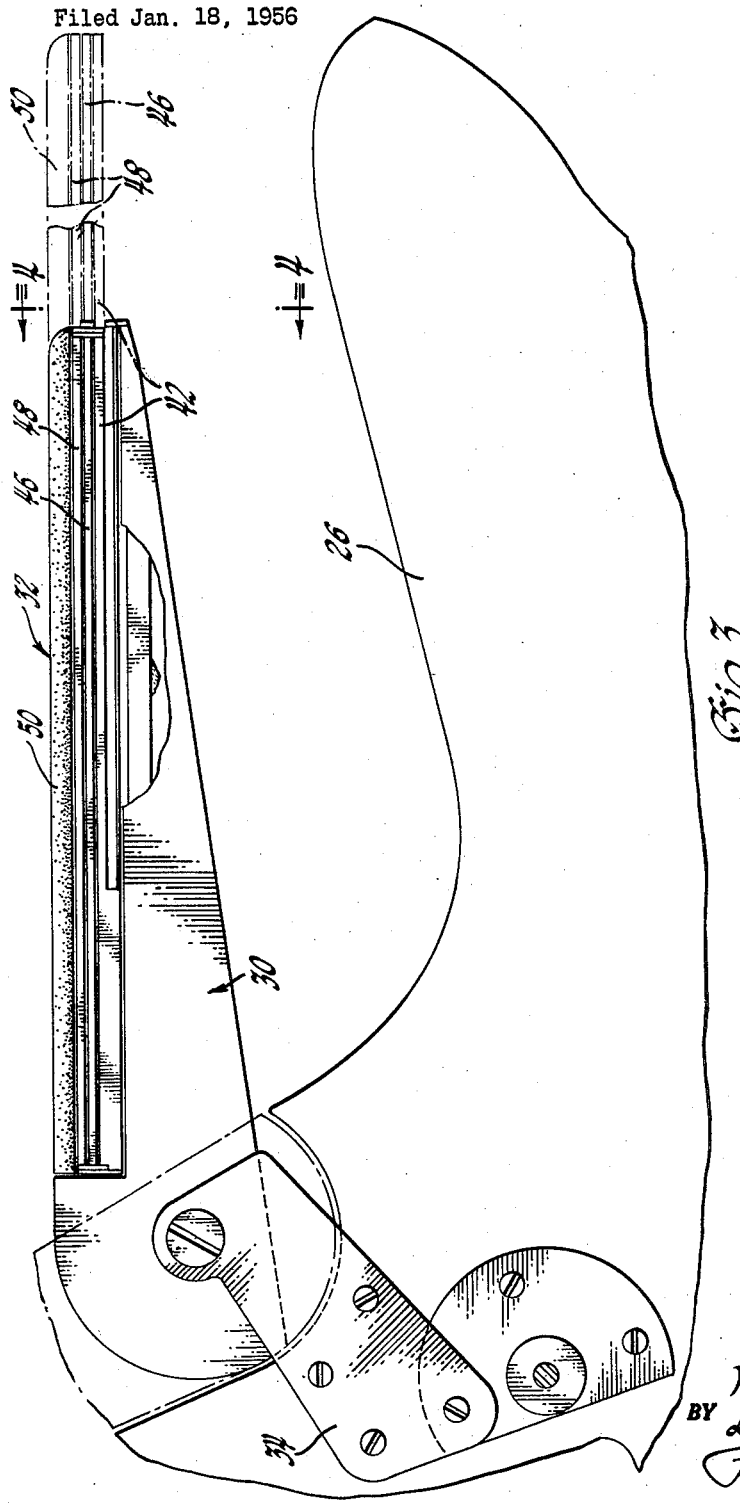
Fig. 3 is an enlarged side elevational view showing the arm rest, the extensible portion of the arm rest being shown in its extended position in broken lines.

The extensible portion of the arm rest comprises a lower member 42 which has, at each side, a depending flange 44 slidably engaged in slots 45 in the nylon guide tracks to mount the extensible portion 32 of the arm rest on the base portion 30 for sliding movement therealong. Figs. 2 and 3 show how the sliding extensible portion 32 of the arm rest can be extended. Any conventional type of stop may be provided if desired to prevent the extensible portion from being pulled out of the base. On the lower member 42 of the extensible portion of the arm rest there is an intermediate leaf 46 and atop the intermediate leaf there is an upper leaf 48 which is capped by padding 50 which may be of any type conventionally used in arm rest constructions.

As shown in Fig. 4, the intermediate leaf 46 is hinged along one side to the lower extensible member 42 by means of a hinge 52 to permit swinging movement of the intermediate leaf 46 about an axis parallel to the track 36. Similarly, the upper leaf 48 is swingably connected by a hinge 54 to the lower leaf for swinging movement about an axis parallel to the guide track 36. Each leaf may be swung through an arc of 180 degrees to horizontal positions at opposite sides of the lower member 42 whereby surfaces of the leaf members and the lower member form a plane table surface as shown in Figs. 2 and 4. As illustrated in Fig. 2, the leaves may be swung to their table forming position whether the extensible portion is in its extended position or its retracted position.

The arm rest is compact and yet is capable of assuming a number of different positions. If desired, the arm rest may be folded to its out-of-the-way or retracted position as shown in broken lines in Fig. 1. In this position, the arm rest is completely out of the way, lying against the stanchion 26 and in the plane of the seat backs so that it takes up no room at all. If desired, the arm rest may be folded down to the position shown in Fig. 1 where it assumes the form of a conventional arm rest. While in this position, either or both of the leaves 46, 48 may be folded out to form a table if desired, or the extensible portion of the arm rest may be pulled out to elongate the arm rest surface. While in this position, either or both of the leaves may be folded out as shown in Figs. 2 and 4 to provide a table which is spaced away from the body of a passenger seated in the car and is conveniently located for writing or for holding food, drinks and the like.

While we have shown and described one embodiment of our invention, it is capable of many modifications. Changes, therefore, in the construction and arrangement may be made without departing from the spirit and scope of the invention as set forth in the appended claims.

We claim:

1. An extensible folding arm rest of the character described, including: a base portion having a guide track thereon; an extensible portion on said base, comprising a lower member, an intermediate leaf member and an upper leaf member; means on the lower member of said extensible portion slidably engaging said guide track for mounting the extensible portion of the arm rest on the base portion for sliding extensible movement therealong; means hingedly mounting said intermediate leaf member on said lower member at one side thereof; and means hingedly mounting said upper leaf member on said lower member at the opposite side thereof, said leaf members being swingable to horizontal positions at opposite sides of said lower member whereby surfaces of said leaf members and said lower member form a plane table surface.

2. An extensible arm rest of the character described, including: a base portion having guide tracks at opposite sides thereof; an extensible portion on said base comprising a lower member, an intermediate leaf member and an upper leaf member; flanges extending from opposite sides of said lower member and slidably engaging said guide tracks for mounting the extensible portion of the arm rest on the base portion for sliding extensible movement therealong; means hingedly mounting said intermediate leaf member on said lower member at one side thereof for swinging movement about an axis parallel to said guide tracks; and means hingedly mounting said upper leaf member on said lower member at the opposite side thereof for swinging movement about an axis parallel to said guide tracks, said leaf members being swingable to horizontal positions at opposite sides of said lower member whereby surfaces of said leaf members and said lower member form a plane table surface.

3. In a vehicle having a seat with a seat back and having a stanchion adjacent said seat and seat back, an extensible folding arm rest of the character described, including: a base portion having guide track means thereon; means pivotally mounting said base portion on said stanchion for swinging movement between a retracted position and a generally horizontal operating position; an extensible portion on said base, comprising a lower member having at least one leaf member supported thereon; means extending from said lower member and slidably engaging said guide track for mounting said extensible portion of the arm rest on the base portion for sliding extensible movement therealong; means hingedly mounting said leaf member on said lower member at one side thereof for swinging movement about an axis parallel to said guide track, said leaf member being swingable to a horizontal position at the side of said lower member whereby surfaces of said leaf member and said lower member form a plane table surface.

4. In a vehicle having a seat with a seat back and having a stanchion adjacent said seat and seat back, an extensible folding arm rest of the character described, including: a base portion having guide tracks at opposite sides thereof; means pivotally mounting said base on said stanchion for swinging movement between a generally vertical retracted position wherein the arm rest lies against the stanchion in the plane of said seat back and a generally horizontal operating position; an extensible portion on said base, comprising a lower member and at least one leaf member supported thereon; flanges extending from opposite sides of said lower member and slidably engaging said guide tracks for mounting the extensible portion of the arm rest on the base portion for sliding extensible movement therealong; and means hingedly mounting said leaf member on said lower member at one side thereof for swinging movement about an axis parallel to said guide tracks, said leaf member being swingable to a horizontal position at the side of said lower member whereby surfaces of said leaf member and said lower member form a plane table surface.

5. In a vehicle having a seat with a seat back and having a stanchion adjacent said seat and seat back, an extensible folding arm rest of the character described, including: a base portion having at least one guide track thereon; means pivotally mounting said base portion on said stanchion for swinging movement between a generally vertical retracted position wherein the arm rest lies against the stanchion in the plane of said seat back and a generally horizontal operating position; an extensible portion on said base, comprising a lower member, an intermediate leaf member and an upper leaf member; means extending from said lower member and slidably engaging said guide track for mounting the extensible portion of the arm rest on the base portion for sliding extensible movement therealong; means hingedly mounting said intermediate leaf member on said lower member at one side thereof for swinging movement about an axis parallel to said guide track; and means hingedly mounting said upper leaf member on said lower member at the opposite side thereof for swinging movement about an axis parallel to said guide track, said leaf members being swingable to horizontal positions at opposite sides of said lower member whereby surfaces of said leaf members and said lower member form a plane table surface.

6. In a vehicle having a seat with a seat back and having a stanchion adjacent said seat and seat back, an extensible folding arm rest of the character described, including: a base portion having guide tracks at opposite sides thereof; means pivotally mounting said base portion on said stanchion for swinging movement between a generally vertical retracted position wherein the arm rest lies against the stanchion in the plane of said seat back and a generally horizontal operating position; an extensible portion on said base, comprising a lower member, an intermediate leaf member and an upper leaf member having a padded top surface; flanges extending from opposite sides of said lower member and slidably engaging said guide tracks for mounting the extensible portion of the arm rest on the base portion for sliding extensible movement therealong; means hingedly mounting said intermediate leaf member on said lower member at one side thereof for swinging movement about an axis parallel to said guide tracks; and means hingedly mounting said upper leaf member on said lower member at the opposite side thereof for swinging movement about an axis parallel to said guide tracks, said leaf members being swingable to horizontal positions at opposite sides of said lower member whereby surfaces of said leaf members and said lower member form a plane table surface.

References Cited in the file of this patent
UNITED STATES PATENTS

| 455,168 | Case | June 30, 1891 |
| 668,489 | Collignon | Feb. 19, 1901 |
| 994,797 | Streit | June 13, 1911 |
| 1,802,620 | Scully | Apr. 28, 1931 |
| 1,835,049 | Hottel | Dec. 8, 1931 |
| 2,494,838 | Slaughter | Jan. 7, 1950 |
| 2,719,066 | Budzinski | Sept. 27, 1955 |